United States Patent [19]

Craig

[11] 4,054,374
[45] Oct. 18, 1977

[54] NONGLARE REAR VIEW MIRROR

[75] Inventor: Gale M. Craig, Anderson, Ind.

[73] Assignee: General Motors Corporation, Detroit, Mich.

[21] Appl. No.: 728,782

[22] Filed: Oct. 1, 1976

[51] Int. Cl.² ............................................. G02B 17/00
[52] U.S. Cl. ..................................... 350/279; 350/267
[58] Field of Search ............... 350/267, 268, 277, 278, 350/279, 280, 312

[56] References Cited

U.S. PATENT DOCUMENTS 3,567,312  3/1971  Platzer, Jr. ...................... 350/267 X Primary Examiner—John K. Corbin
Assistant Examiner—Matthew W. Koren
Attorney, Agent, or Firm—J. C. Evans

[57] ABSTRACT

A nonglare rear view mirror assembly includes a combination diaphragm and bellows and a front transparent lens on the bellows defining a variable volume chamber of opaque liquid rearwardly of the transparent lens. A light reflective mirror is connected to a plurality of bosses on the diaphragm to define a liquid pump chamber in communication with the variable volume chamber. The diaphragm is associated with a rigid cover to define a variable pressure space selectively connected to a source of power fluid to flex the diaphragm to direct opaque liquid from the pump chamber into the variable volume chamber behind the lens for producing a nonglare light reflection under night operation and operative under daylight conditions to flex the diaphragm to draw liquid from between the lens and mirror to locate the mirror adjacent the lens for producing greater light reflectivity.

5 Claims, 8 Drawing Figures

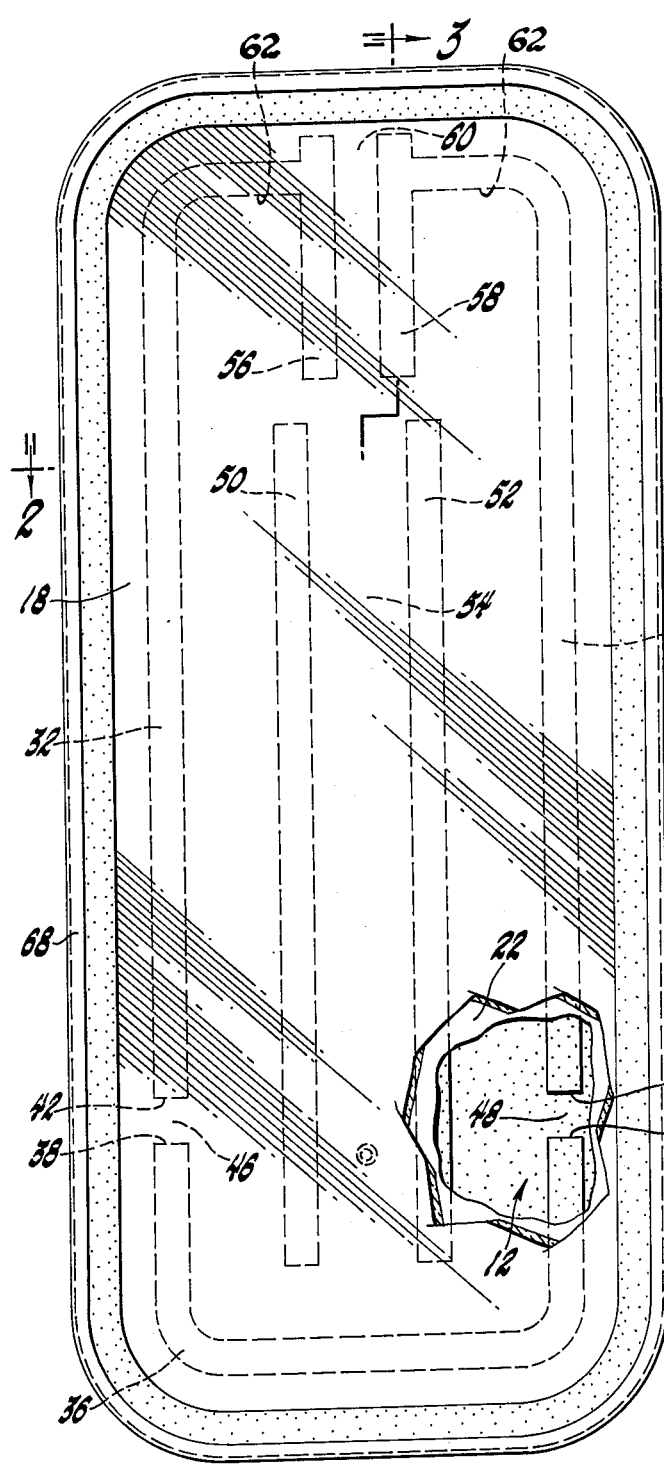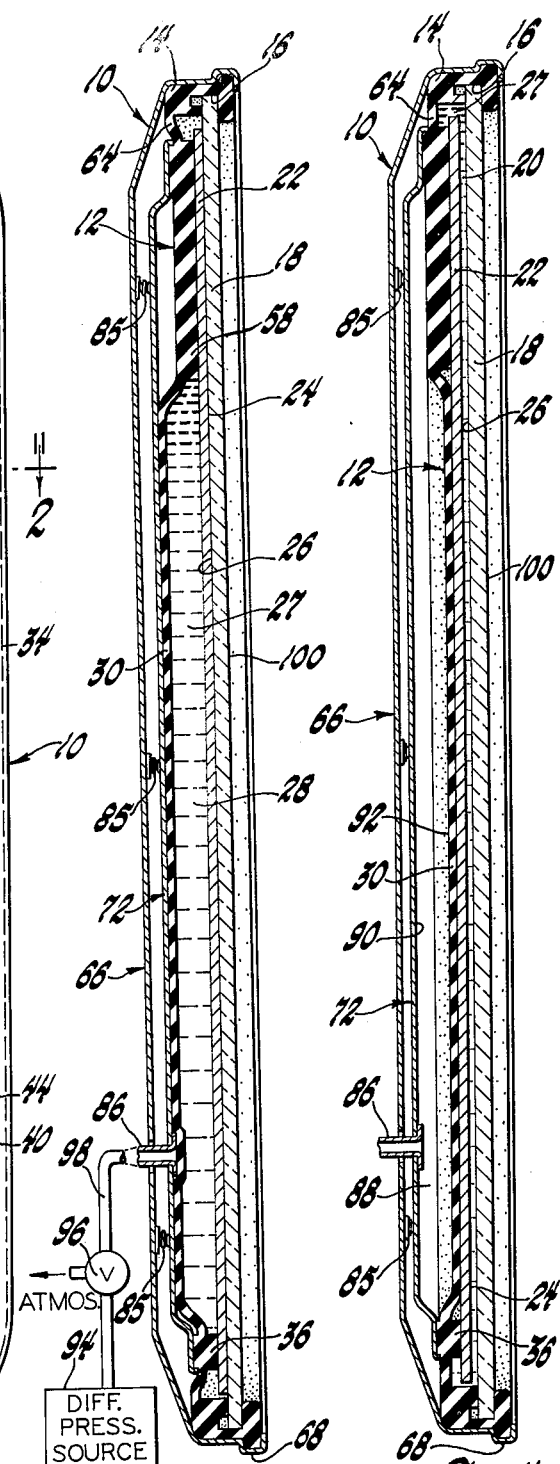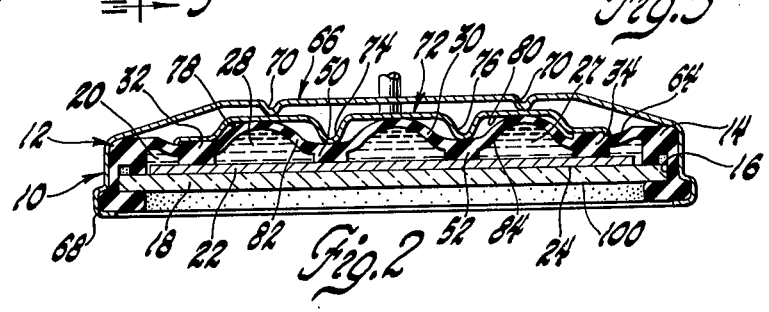

NONGLARE REAR VIEW MIRROR

This invention relates to day and night type rear view mirror assemblies and more particularly to such mirrors including a reservoir of opaque liquid selectively withdrawn or directed between a mirror and lens component of the assembly to produce a high order light reflectivity from a bright mirror surface under daylight conditions and to produce a reduced level of light reflectivity from a cover lens under night operating conditions.

Rear view mirror assemblies containing liquid light controlling medium for regulating the amount of light reflectivity from component parts of a mirror assembly have been proposed including U.S. Pat. No. 3,000,262 issued September, 1961, to Rabinow et al., which discloses a bright mirror surface selectively moved within a chamber filled with opaque liquid relative to a transparent front lens. When the bright mirror surface is located rearwardly of the transparent front lens a lesser light reflective surface, defined by the lens, reduces glare under night operation. Day operation includes placement of the mirror nearer the front lens so that a highly polished light reflecting surface on the mirror reflects light under daylight operating conditions. The resultant effect is to sharply define images under daylight operation while reducing glare of light reflections from the mirror assembly during night operation.

A further proposal for such mirror assemblies is set forth in U.S. Pat. No. 3,233,515 issued Feb. 2, 1966, to G. E. Platzer, Jr., et al. This arrangement suggests positioning the highly light reflective mirror component of the assembly within the liquid enclosed chamber and more particularly to locate a highly reflective mirror surface closely adjacent a transparent front lens to prevent dual reflections from the assembly.

Yet another proposal for day and night nonglare mirror assemblies is set forth in U.S. Pat. No. 3,259,017 issued July 5, 1966, to Faulhaber. In the Faulhaber proposal a separate liquid pump assembly supplies opaque liquid to a mirror unit having a bellows that joins rigid members in the form of a mirror and a front lens. A space between the rigid members is filled with opaque fluid from the separate pump assembly. Under nighttime conditions the pump discharges opaque liquid from a separate pump chamber into a space between the mirror and lens components and the peripherally located bellows expands to cause the mirror to shift from the lens to produce a less reflective nonglare condition. Under daylight conditions liquid is withdrawn from the space between the rigid lens and rigid mirror plate and the peripheral bellows positions the mirror in close proximity to the clear lens to produce a highly reflective surface for daylight operation.

While the aforesaid arrangements are suitable for their intended purpose, they either require special process steps during manufacture or a large number of separate operative components to accomplish the desired results of a highly reflective daylight mirror and a nonglare lesser reflection under night operation.

In U.S. Pat. No. 3,233,515 the mirror assembly is actuated by a centrally connected mechanical drive. In such arrangements, when the mirror assembly is moved to a night condition, a region of low atmospheric pressure is produced between the lens and mirror. This can produce a resultant bow in the mirror plate with the peripheral edge thereof maintained in close proximity to the front lens. Flow of liquid during transition from day to night conditions is restricted by the bow effect and actuation time from day to night conditions is noticeable, especially under low temperature conditions. A further problem encountered in mirror assemblies of the type disclosed in U.S. Pat. No. 3,233,515 is the fact that air bubbles can be trapped within the fluid chamber unless the unit is carefully immersed during assembly of the unit in a liquid bath to assure that no air enters liquid compartments in the mirror assembly.

The Faulhaber mirror has a separate pump unit including a diaphragm component and a rigid liquid pump chamber cap and fluid is transferred from this separate pump into a variable volume liquid chamber made of spaced rigid walls and an interconnecting peripheral bellows component.

The liquid pump of the Faulhaber system is in turn connected to a source of vacuum to actuate the pump which in turn operates the mirror assembly. Hence the system requires substantial numbers of separate parts and a bulk that makes installation a problem.

An object of the present invention is to improve fluid type day/night rear view mirror assemblies by provision therein of a combination diaphragm and bellows component which results in a highly compact system wherein the movable mirror component of the assembly forms part of the liquid pump chamber in the assembly.

Yet another object of the present invention is to improve fluid actuated day/night rear view mirror assemblies by the provision of an assembly having short fluid paths between a liquid pumping chamber of the assembly and a variable volume space between rigid lens and mirror components of the assembly to produce faster mirror response and less delay of movement of the mirror assembly between day and night operating conditions irrespective of the viscosity of the light controlling liquid in the assembly.

Yet another object of the present invention is to improve the operation of a fluid controlled day/night rear view mirror assembly having an integral pump and liquid filled chamber for regulating light reflectivity of the assembly wherein only one liquid tight seal is provided in the assembly by a dual diaphragm and bellows component therein characterized by constituting a one-piece frame for a clear lens component of the mirror assembly; a mirror support as well as a pump diaphragm in the assembly thereby to result in a combined assembly which is easily assembled and repaired.

Still another object of the present invention is to provide an improved fluid controlled day/night rear view mirror assembly wherein a diaphragm liquid pump is included to position a mirror component for controlling reflectivity from the mirror assembly and wherein the diaphragm pump of the assembly has at least one rigid pump chamber wall and at least one flexing chamber wall wherein the rigid wall is defined by a movable mirror element of the combination.

Further objects and advantages of the present invention will be apparent from the following description, reference being had to the accompanying drawings wherein a preferred embodiment of the present invention is clearly shown.

FIG. 1 is a front elevational view of one embodiment of the present invention;

FIG. 2 is a horizontal sectional view taken along the line 2—2 of FIG. 1 looking in the direction of the arrows;

FIG. 3 is a vertical cross sectional view taken along the line 3—3 of FIG. 1 showing the mirror in a daylight operating position;

FIG. 4 is a section like FIG. 3 showing the component parts of the mirror assembly in FIG. 1 in a non-glare, night position of operation;

Figure 5:
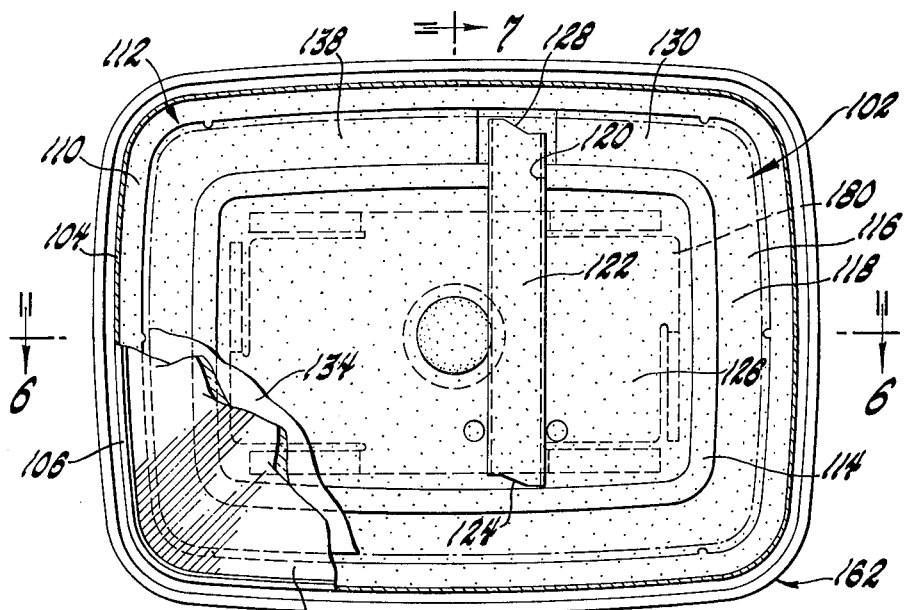
FIG. 5 is a front elevational view of a second embodiment of the present invention with its lens removed.
Figure 6:
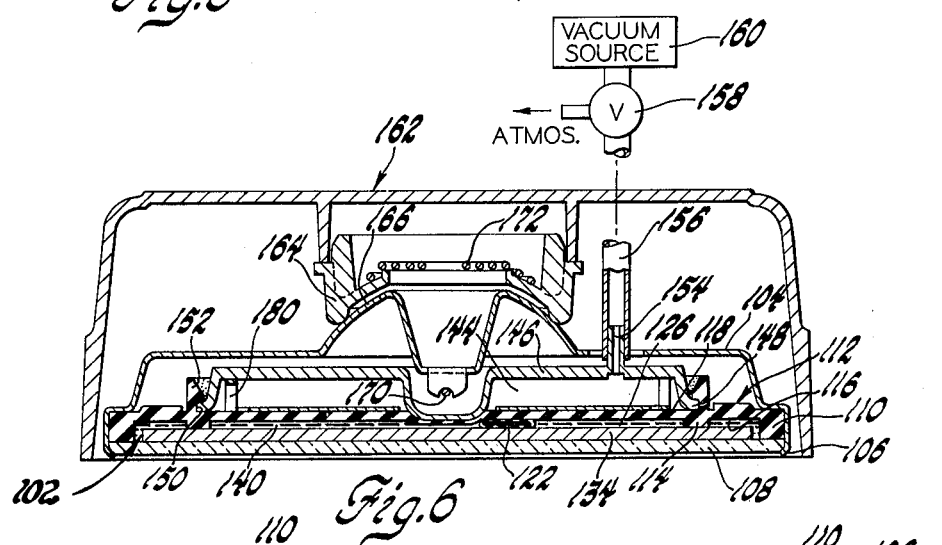
FIG. 6 is a horizontal sectional view taken along the line 6—6 of FIG. 5 looking in the direction of the arrows with its lens in place.

Referring now to the drawings, in FIGS. 1-4, a mirror assembly 10 is illustrated including a unitary bellows and diaphragm subassembly 12 made of flexible polymeric material. It includes a peripheral flange portion 14 having a circumferential groove 16 therein in which is supportingly received a transparent plate or lens 18 that extends across the full planar extent of the viewing surface of the mirror assembly 10. The lens 18 represents an inflexible, rigid front of a variable volume chamber 20 closed by the lens 18 forwardly of the mirror assembly 10 and closed rearwardly thereof by a rigid, movable mirror element 22 having a highly light reflective front surface 24 thereon located in parallelism with the rear surface 26 of the transparent lens 18.

As more particularly shown in FIGS. 2 through 4, the variable volume chamber 20 is filled with an opaque liquid 27.

The rigid movable mirror element 22 forms the front of a variable volume liquid pump chamber 28 having the rear surface thereof formed by a flexible diaphragm segment 30 of the unitary subassembly 12. The diaphragm 30 includes a plurality of side bosses 32, 34 thereon located in spaced parallelism and extending along the height of the chamber 28 on each side thereof as shown in FIG. 1. A U-shaped boss 36 is also provided on the diaphragm 30 including end portions 38, 40 thereon spaced with respect to end portions 42, 44 on the side bosses 32, 34 to define flow paths in passages 46, 48 from the pump chamber 28 into the variable volume chamber 20 near the base of the mirror assembly 10. Likewise, the diaphragm 30 includes internal, parallel integral ribs 56, 58 thereon extending into the chamber 28 and defining an additional flow path 60. Rib segments 56, 58 and bosses 32, 34 combine with element 22 and diaphragm to form pockets 62 to trap air bubbles which enter chamber 28 during liquid fill of assembly 10. Air bubbles within the mirror assembly 10 flow to pockets 62 during operation from night to day positions shown in FIGS. 4 and 3, respectively.

The diaphragm 30 further includes a circumferential web segment 64 thereon which joins the diaphragm to the peripheral flange 14. The rigid mirror element 22 forms the front surface of the pump chamber 28 and is secured to the diaphragm 30 at the bosses thereon so that movement of the diaphragm 30 with respect thereto will either draw liquid into or out of the chamber 28 through very short fluid paths as defined at 46, 48 and 60 in the illustrated arrangement. The bosses serve to reinforce mirror element against flexural distortion during mirror operation.

The mirror assembly 10 further includes a sheet metal back 66 having a peripheral flange 68 thereon bent forwardly of the flange 14 continuously circumferentially therearound as shown in FIG. 1 to secure the component parts of the mirror assembly together. The sheet metal back 66 is deformed inwardly along segments 70 thereof to form an abutment surface for a sheet metal diaphragm support 72 so as to define a maximum position stop for the support 72 under certain modes of operation. The support 72 is deformed at spaced parallel points thereon to form ribs 74, 76 in engagement with the diaphragm ribs 50, 52 and includes outboard formed concavities 78, 80 for supportingly receiving segments 82, 84 of the diaphragm 30 when the mirror is in a daylight position of operation.

The back 66 supportingly receives a plurality of spring elements 85, at spaced points therealong to bias the support 72 internally of the mirror assembly with respect to the back 66.

A fluid fitting 86 is directed through the back 66 and is in communication with a pressurizable chamber 88 formed between the front surface 90 of the support 72 and the rear or outboard surface 92 of the diaphragm 30. The chamber 88 is communicated by the fluid fitting 86 with a suitable pressure source representing either a source 94 of pressure, either positive or vacuum. When the spring elements 85 are present in the assembly, the pressure source is in the form of a positive pressure connected by a control valve 96 through a conduit 98 to the fitting 86.

Under a daylight mode of operation the pressurizable chamber 88 is disconnected from the pressure source 94 by the valve 96 and the charge pressure within the pump chamber 28 will press the diaphragm 30 against the back plate 72 so that the assembly will assume the position shown in FIG. 3. Springs 85 act to move back plate 72, diagphragm 30, mirror element 22 and liquid contained between diaphragm 30 and element 22 forwardly. This locates the rigid mirror element 22 in close, juxtaposed proximity with the rear surface 26 of the lens 18. Accordingly, the highly light reflective front surface 24 of the mirror element 22 will reflect light under daylight conditions to define a rear view field for the mirror assembly 10.

The mirror element 22 serves the function of defining a rigid wall for the pump chamber 28, and further serves to define the viewing field for the mirror assembly 10.

Night operation includes connecting the pressure source 94 to the fitting 86 and the pressurizable chamber 88 to press the diaphragm 30 toward the rigid mirror element 22. This causes opaque liquid 27 in the chamber 28 to be directly transferred through the short paths represented by passages 46, 48 and 60 into the variable volume chamber 20 as shown in FIG. 4. The paths cause the opaque liquid to flow completely around the periphery of the mirror element 22 at the outer edge thereof so that there is an immediate surge of opaque liquid into the space between the front surface 24 of the mirror 22 and the rear surface 26 of the lens 18 thereby to produce a positive pressure condition to occur therein as the mirror element 22 is displaced rearwardly of the rear surface 26. The resultant effect is to locate a layer of opaque liquid in the variable volume chamber 20 as shown in FIG. 4 to block the passage of light to the highly light reflective surface 24 on the mirror 22. Therefore, light reflected from the mirror assembly 10 is that which is reflected from the front surface 100 of the lens 18. The reflectivity of surface 100 is less than that of mirror surface 24 and the mirror assembly 10, under night conditions of operation, thus has a reduced reflectivity and a nonglare image when high intensity light sources are directed thereagainst.

The resultant mirror assembly thus isolates air bubbles that might be located in the opaque liquid during the manufacturing operation by provision of the fluid paths 54, 60 into the pocket 62.

Furthermore, the unit is extremely compact by provision of the unitary diaphragm and bellows subassembly 12. Since the rigid mirror 22 of the combination forms part of the pump chamber 28 the unit is further reduced in size and complexity.

Additionally, the diaphragm 30 has a special configuration including short fluid path passages 46, 48, 60 to produce a quick transfer of opaque liquid from the pump chamber 28 into the variable volume chamber 20 between the mirror and the lens to establish either a high degree of reflectivity (daylight operation) or a reduced reflectivity or nonglare condition (night operation). The short path passages 46, 48 enable the mirror to be quickly responsive to positioning in either a night or a daytime operating mode even though the viscosity of the liquid contained in the mirror assembly is increased because of cold weather conditions. Furthermore, the liquid transfer is produced completely peripherally around the mirror element 22 so as to prevent a negative pressure condition from existing within the variable volume chamber 20 during movement from a daytime to night position thereby to assure a clear image and quick transition from a day to night mode of operation by virtue of the fact that the mirror element 22 is not subjected to differential unit loading across the planar extent thereof which might otherwise distort it as in the case where the mirror element is connected to a center mount actuator type system.

Yet another feature of the present invention is that the support or back plate 72 is configured to hold the flexible diaphragm 30, when in a night position, and ribs 50, 52 thereon are located against mirror element 22 as shown in FIG. 2. As a result, the ribs 50, 52 serve to distribute the force of the springs 85 uniformly across the mirror element 22. This avoids flexural deformation in the element 22 and any resultant formation of pockets in the viewing field in which dark liquid might be trapped.

Yet another embodiment of the present invention is illustrated in FIGS. 5 through 8 of the present invention. This mirror assembly is of smaller planar extent than the embodiment shown in FIGS. 1 through 4 and is suitable for use on a passenger car type vehicle. It shows a mirror assembly 102 having a rear frame 104 with a front peripheral flange 106 that clamps the periphery of a clear transparent front plate or lens 108 with respect to an enlarged peripheral segment 110 on a unitary bellows and diaphragm subassembly 112 made of flexible, polymeric material.

The unitary subassembly 112 includes an inboard radially inner, perimetric boss 114 thereon extending around the inside surface 116 of a flexible diaphragm segment 118 of the subassembly 112. The boss 114 includes an upper opening 120 therein in which is located a tube 122 having an inlet end 124 in communication with a low point in a liquid filled pump chamber 126 and having an upper open end 128 in communication with a variable volume cavity 130 formed between the front surface 132 of a mirror element 134 and a rear surface 136 of the front lens 108.

Figure 8:
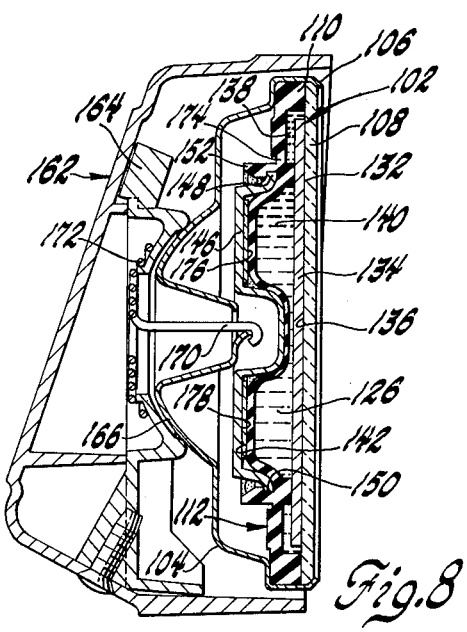
FIG. 8 is a vertical sectional view like FIG. 7 showing the component parts of the mirror assembly in a day position of operation.

More particularly, under day conditions of operation the source of vacuum 160 is connected to vacuum hose 156 thereby reducing to a level below atmospheric the pressure in chamber 144. Fluid pressure in pump chamber 126 forces diaphragm 118 against the pressure of spring 180 into the outwardly formed cavities 176, 178 in the back 146 as best shown in FIG. 8. As a result, fluid pressure in chamber 126 and cavity 130 is reduced to a value below atmospheric. The force of atmospheric pressure distributed across the rearward surfaces of back 146 and web portion 174 of diaphragm segment 118 forces back 146, diaphragm boss 114, and mirror element 134 forward to bring mirror element 134 into contact with lens 108 as shown in FIG. 8.

Figure 7:
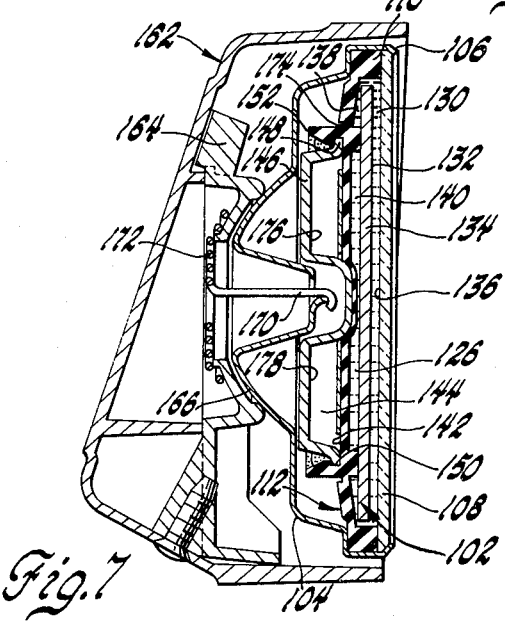
FIG. 7 is a vertical sectional view taken along the line 7—7 of FIG. 5 looking in the direction of the arrows and showing the component parts of the assembly in a night, nonglare position of operation.

The top of cavity 130 collects any air trapped during assembly of mirror assembly 102. Tube 122 serves to direct air trapped in opaque liquid 140 which fills the pump chamber 126 and the cavity 130 and passes it into a separator space 138 at the top of pump chamber 126. The flow of air into space 138 occurs during operation of the mirror between its night to day positions as shown in FIGS. 7 and 8, respectively.

In the illustrated arrangement, the inboard boss 114 is connected to the rear of the mirror element 134 to complete the chamber 126 as constituted by the flexible diaphragm segment 118 and the rigid mirror element 134. The diaphragm segment 118 also defines the inboard wall 142 of a vacuum chamber 144 closed on the outside by a rigid back 146 with a peripheral flange 148 thereon supportingly received within a groove 150 formed continuously circumferentially around an outboard extension 152 formed continuously around the diaphragm segment 118 at the inboard boss 114 thereon. The rigid back 146 has a fluid fitting 154 thereon which connects to a vacuum hose 156 under the control of a valve assembly 158 for selectively connecting the vacuum hose 156 to a vacuum source 160. In the illustrated arrangement the mirror assembly 102 is shown supported within a housing 162 having a socket segment 164 thereon that supportingly receives a spherical surface 166 on the frame 104. A hook element 170 is directed through the spherical surface 166 and is connected to a retention spring 172 interlocked to the outboard surface of the socket 164 to spring bias the frame 104 into a spring biased interrelationship between the spherical surface 166 and the socket 164.

The mirror assembly 102 is readily adjusted by applying finger pressure to different offset portions of the assembly 102 to produce a desired angular relationship between the overall mirror assembly 102 within the housing 162.

When the vacuum is disconnected from the hose 156 the variable volume chamber 144 is in communication with atmosphere. Accordingly, spring pressure acting on the diaphragm segment 118 will position it in the location shown in FIG. 7 so as to displace liquid from the pump chamber 126 into the variable volume cavity 130 between the mirror element 134 and the lens 108. When the cavity 130 is filled with opaque fluid, light impingement on the mirror assembly 102 is reflected in part from the outboard surface of the lens 108 to produce a nonglare image reflection therefrom.

Under day conditions of operation the source of vacuum 160 is connected to the vacuum hose 156 and atmospheric pressure will act on the web portion 174 of diaphragm segment 118 to force liquid from the cavity 130 through the vent tube 122 into the pump chamber 126. This forces the diaphragm segment 118 into the outwardly formed concavities 176, 178 in the back 146 as best shown in FIG. 8. As a result, the mirror element 132 is displaced forwardly into juxtaposed relationship with the lens 108 so that the highly light reflective front surface 132 thereon will produce a sharp daytime image from the mirror assembly 102. A return spring 180 in chamber 144 biases diaphragm segment from the back 146 when the assembly is conditioned for night operation.

All of the aforementioned advantages of the mirror assembly of the present invention as set forth in the embodiment of FIGS. 1 through 4 are likewise present in the embodiment of the invention described with respect to FIGS. 5 through 8 with it being understood that this embodiment of the invention is more suitable for use in passenger car vehicles while the embodiment of the first invention is characterized by having a larger planar extent in the viewing field thereof thus making it more suitable for truck and heavy duty applications. In both cases, when the mirror assembly is in a day position about 4% of incident light is reflected from the front surface, about 75% of the incident light is reflected from the mirror element and the remainder is absorbed, largely in a very thin, interelement film between mirror and front lens components and in the lens component itself. When the mirror assembly, both embodiments, is in a night position most of the incident light is absorbed in the layer of opaque liquid which overlies the mirror elements and only about 4% of the incident light is reflected from the outer lens surface as a visible, non-glare image.

While the embodiments of the present invention, as herein disclosed, constitute a preferred form, it is to be understood that other forms might be adopted.

The embodiments of the invention in which an exclusive property or privilege is claimed are defined as follows:

1. A nonglare rear view mirror comprising a transparent front plate having a front planar extent defining a viewing surface and an inboard surface, a mirror member having a light reflective surface disposed in parallelism to said front plate, a flexible member having a bellows segments sealingly engaged with the periphery of said front plate to define a variable volume chamber behind said plate, said flexible member including a diaphragm segment integrally formed with said bellows segment and extending across the outboard surface of said mirror member to define a pump chamber, bosses on the inboard side of said diaphragm segment secured to said mirror member for reinforcing the planar extent of said mirror member against flexural distortion, means filling said chambers with opaque liquid, and means including said diaphragm segment forming a pressurizable chamber on the outboard side of said diaphragm selectively connected to a differential pressure source to move said diaphragm segment toward and away from said front plate, said diaphragm segment positioning said mirror member spaced from said front plate in response to a first pressure in said pressurizable chamber to cause opaque liquid to flow between said light reflective surface uniformly around the outer perimeter of said mirror member and said front plate to block passage of light rays to said mirror element and produce a nonglare reflection from the outer surface of said front plate, said diaphragm segment positioning said mirror member against said fornt plate in response to a second pressure in said chamber to displace said opaque liquid from the viewing field to produce direct reflection of light rays through said front plate from the reflective surface of said mirror member.

2. A nonglare rear view mirror comprising a transparent front plate having a front planar extent defining a viewing surface and an inboard surface, a mirror member having a light reflective front surface disposed in parallelism to said front plate, a flexible member having a peripheral bellows segment sealingly engaged with the periphery of said front plate, said member including a flexible diaphragm segment integrally formed with said peripheral bellows segment and extending across the full planar extent of the inboard surface of said front plate to define a sealed liquid pump chamber between said diaphragm segment and said mirror member and a variable volume chamber forwardly of said mirror member, means including bosses on the inboard side of said diaphragm segment secured to said front plate for communicating said pump chamber and variable volume chamber, said bosses supporting said mirror member against flexure, opaque liquid filling said chambers and means including said diaphragm segment forming a pressurizable chamber on the outboard side of said diaphragm selectively connected to a differential pressure source to move said diaphragm segment toward and away from said front plate, said diaphragm segment positioning said mirror member spaced from said front plate in response to a first pressure in said pressurizable chamber to cause opaque liquid to flow between said light reflective surface and said front plate to produce a nonglare reflection from the front plate, said diaphragm positioning said mirror member against said front plate in response to a second pressure in said chamber to displace said opaque liquid from the viewing field to produce direct reflection of light rays through said reflective surface of said mirror member.

3. A nonglare rear view mirror comprising a transparent front plate having a front planar extent defining a viewing surface and an inboard surface, a mirror member having a light reflective surface disposed in parallelism to said front plate, a flexible member having a bellows segment sealingly engaged with the periphery of said front plate, said flexible member including a diaphragm segment integrally formed with said bellows segment and extending across the full planar extent of the inboard surface of said front plate to define a sealed cavity between said diaphragm segment and said front plate, bosses on the inboard side of said diaphragm segment secured to said mirror member for reinforcing the planar extent of said mirror member against flexural distortion and defining a pump chamber in said cavity made up in part by said mirror member, opaque liquid filling said cavity, and means including said diaphragm segment forming a pressurizable chamber on the outboard side of said diaphragm selectively connected to a differential pressure source to move said diaphragm segment toward and away from said front plate, said diaphragm segment positioning said mirror member spaced from said front plate in response to a first pressure in said chamber to cause opaque liquid to flow between said light reflective surface uniformly around the outer perimeter of said mirror member and said front plate to block passage of light rays to said mirror element and produce a nonglare reflection from the outer surface of said front plate, said diaphragm segment positioning said mirror member against said front plate in response to a second pressure in said chamber to displace said opaque liquid from the viewing field to produce direct reflection of light rays through said front plate fron the reflective surface of said mirror member.

4. A nonglare rear view mirror comprising a transparent front plate having a front planar extent defining a viewing surface and an inboard surface, a mirror member having a light reflective surface disposed in parallelism to said front plate, a flexible member having a bellows segment sealingly engaged with the periphery of said front plate, said flexible member including a diaphragm segment integrally formed with said bellows segment and extending across the full planar extent of the inboard surface of said front plate to define a sealed cavity between said diaphragm segment and said front plate, bosses on the inboard side of said diaphragm segment secured to said mirror member for reinforcing the planar extent of said mirror member against flexural distortion, opaque liquid filling said cavity, a vacuum source, means including said diaphragm segment forming a vacuum chamber on the outboard side of said diaphragm selectively connected to said vacuum source and to atmosphere to move said diaphragm segment toward and away from said front plate, said diaphragm segment positioning said mirror member spaced from said front plate in response to atmospheric pressure in said chamber to cause opaque liquid to flow between said light reflective surface uniformly around the outer perimeter of said mirror member and said front plate to block passage of light rays to said mirror element and produce a nonglare reflection from the outer surface of said front plate, said diaphragm segment positioning said mirror member against said front plate in response to a vacuum in said chamber to displace said opaque liquid from the viewing field to produce direct reflection of light rays through said front plate from the reflective surface of said mirror member.

5. A nonglare rear view mirror comprising a transparent front plate having a front planar extent defining a viewing surface and an inboard surface, a mirror member having a light reflective surface disposed in parallelism to said front plate, a flexible member having a bellows segment sealingly engaged with the periphery of said front plate, said flexible member including a diaphragm segment integrally formed with said bellows segment and extending across the full planar extent of the inboard surface of said front plate to define a sealed cavity between said diaphragm segment and said front plate, bosses on the inboard side of said diaphragm segment secured to said mirror member for reinforcing the planar extent of said mirror member against flexural distortion, opaque liquid filling said cavity, a pressure source, a back frame, a diaphragm support, means including said diaphragm segment and said diaphragm support forming a chamber on the outboard side of said diaphragm selectively connected to atmosphere and said pressure source to move said diaphragm segment toward and away from said front plate, spring means interposed between said back frame and support to bias said support from said frame, said diaphragm segment positioning said mirror member spaced from said front plate in response to above atmospheric pressure in said chamber to cause opaque liquid to flow between said light reflective surface uniformly around the outer perimeter of said mirror member and said front plate to block passage of light rays to said mirror element and produce a nonglare reflection from the outer surface of said front plate, said diaphragm support segment positioning said mirror member against said front plate in response to atmospheric pressure in said chamber to displace said opaque liquid from the viewing field to produce direct reflection of light rays through said front plate from the reflective surface of said mirror member.

* * * * *